United States Patent
Tambe et al.

(10) Patent No.: US 11,592,359 B2
(45) Date of Patent: Feb. 28, 2023

(54) SYSTEM AND METHOD FOR CALCULATING RISK ASSOCIATED WITH FAILURES IN PROCESS PLANTS

(71) Applicant: Tata Consultancy Services Limited, Mumbai (IN)

(72) Inventors: Yogesh Angad Tambe, Pune (IN); Purushottham Gautham Basavarsu, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/036,291

(22) Filed: Sep. 29, 2020

(65) Prior Publication Data
US 2021/0302275 A1 Sep. 30, 2021

(30) Foreign Application Priority Data
Mar. 26, 2020 (IN) .............................. 202021013240

(51) Int. Cl.
*G01M 99/00* (2011.01)
*G06F 11/30* (2006.01)

(52) U.S. Cl.
CPC ............. *G01M 99/00* (2013.01); *G06F 11/30* (2013.01)

(58) Field of Classification Search
CPC ................................ G01M 99/00; G06F 11/30
See application file for complete search history.

(56) References Cited

U.S. PATENT DOCUMENTS

| | | | |
|---|---|---|---|
| 7,937,679 B2 | 5/2011 | Mariani | |
| 2003/0171897 A1* | 9/2003 | Bieda | G06F 30/00 702/185 |
| 2005/0154561 A1* | 7/2005 | Legault | G06F 11/008 702/183 |

(Continued)

FOREIGN PATENT DOCUMENTS

CN 109359894 A 2/2019

OTHER PUBLICATIONS

"Risk Ranking and Filtering Guide", Manufacturing Technology Committee—Risk Management Working Group, Draft Proposal—Not for Implementation, May 29, 2008, Revision 04, 10 pages.*

*Primary Examiner* — Alexander Satanovsky
(74) *Attorney, Agent, or Firm* — Finnegan, Henderson, Farabow, Garrett & Dunner LLP (57) ABSTRACT

This disclosure relates generally to a system and method to estimate an operational risk associated with one or more failures in at least one unit of a process plant. There is a continuous stream of operational data of several variables such as temperature, pressure, etc. Detections are defined in terms of acceptable/unacceptable ranges of parameters over a finite period and operating load of the unit. Often, these predefined parameters must be within a specified range based on operating condition of the process plant and when the measured parameters go beyond, a failure is detected. A risk priority number is estimated from number of occurrences of failure mode, average percentage change from dynamic limits with severity and degree of correlation with detectability from operational data and dynamic limits. Herein, operational risk associated with failure modes can be calculated and updated from time to time automatically from the stream of operational data.

7 Claims, 8 Drawing Sheets

(56) References Cited

U.S. PATENT DOCUMENTS

| | | | |
|---|---|---|---|
| 2006/0167579 A1* | 7/2006 | Fujii | G06Q 50/04 |
| | | | 700/109 |
| 2009/0138316 A1 | 5/2009 | Weller et al. | |
| 2013/0030582 A1* | 1/2013 | Chamblin | F01K 13/02 |
| | | | 700/287 |
| 2019/0198136 A1* | 6/2019 | Hou | G16C 20/70 |

* cited by examiner

SYSTEM AND METHOD FOR CALCULATING RISK ASSOCIATED WITH FAILURES IN PROCESS PLANTS

CROSS-REFERENCE TO RELATED APPLICATIONS AND PRIORITY

This U.S. patent application claims priority under 35 U.S.C. § 119 to India Application No. 202021013240, filed on Mar. 26, 2020. The entire contents of the abovementioned application are incorporated herein by reference.

TECHNICAL FIELD

The disclosure herein generally relates to a field of estimating operational risk associated with failures in a process plant, and, more particularly, to a system and method to estimate an operational risk associated with one or more failures in at least one unit of a process plant.

BACKGROUND

Failure Mode and Effect Analysis (FMEA) is a step by step approach for identifying possible failure modes in design, manufacturing/process, operation or services. Assessing the operational risk associated with failure modes is an important aspect of FMEA for enabling decision making with regards to either design changes or operations. There are several ways in which the operational risk can be assessed. One such method popular in FMEA application is the use of risk Priority Number (RPN) which is used for assessing operational risk associated with potential failures identified during FMEA analysis to prioritize addressing the operational risks and take corrective action against high operational risk failure modes. Existing RPN calculation method requires past experience and engineering judgement to rate each failure by giving occurrence, severity and detectability rating to each failure mode.

Existing methods require cross functional teams to sit together which take a lot of time to come up with ratings for failures and is based on subjective judgement of the team. In process FMEA, equipment or plant degrades with time changing the operational risk profile and hence it is difficult to estimate operational risk associated with failures from experience at more frequent intervals.

SUMMARY

Embodiments of the present disclosure present technological improvements as solutions to one or more of the above-mentioned technical problems recognized by the inventors in conventional systems. For example, in one embodiment, a processor-implemented method to estimate an operational risk associated with one or more failures in at least one unit of a process plant is provided.

The processor-implemented method includes receiving a plurality of operational data of one or more variables of at least one unit of a process plant and pre-processing the received plurality of operational data of the one or more variables to exclude one or more data points. Herein, the exclusion of one or more data points is corresponding to an input to one or more sensors of the at least one unit, a shutdown and a restart of the at least one unit. Further, the method includes calculating a range limit of each of the one or more variables over a predefined finite period based on one or more operating loads of the at least one unit of the process plant, identifying at least one failure mode over a predefined finite period based on the calculated range limit of each of the one or more variables. The at least one failure mode occurs when the operational data of each of the one or more variables go beyond a predefined threshold range limits in a predefined window of time.

Furthermore, the processor-implemented method includes determining a degree of deviation from the calculated range limit of variables of the at least one unit to indicate severity for the at least one identified failure mode over the pre-defined finite period, and a degree of correlation of variables to indicate detectability of the at least one identified failure mode over predefined finite period. At the final, the processor-implemented method includes estimating a risk priority number of the at least one identified failure mode based on the determined occurrence, severity and detectability of the identified at least one failure mode. It would be appreciated that the severity is linked to a predefined degree of deviation from the calculated range limit and the detectability is linked to a predefined degree of correlation among the one or more variables.

In another embodiment, a system is configured to estimate an operational risk associated with one or more failures in at least one unit of a process plant is provided. The system includes at least one memory storing a plurality of instructions, and one or more hardware processors communicatively coupled with at least one memory. Herein, the one or more hardware processors are configured to execute one or more modules. One or more modules comprising a receiving module, a pre-processing module, a calculation module, a failure mode identification module, a deviation determination module, a correlation determination module, and an estimation module.

The receiving module is configured to receive a plurality of operational data of one or more variables of at least one unit of a process plant. The pre-processing module is configured to pre-process the received plurality of operational data of the one or more variables to exclude one or more data points. Wherein, the one or more data points are corresponding to an input to one or more sensors of the at least one unit, a shutdown and a restart of the at least one unit. A calculation module is configured to calculate a range limit of each of the one or more variables over a predefined finite period based on one or more operating loads of the at least one unit of the process plant. The failure mode identification module of the system is configured to identify at least one failure mode over a predefined finite period based on the calculated range limit of each of the one or more variables. It is to be noted that the at least one failure mode occurs when the operational data of each of the one or more variables go beyond a predefined threshold range limits in a predefined window of time.

Further, the deviation determination module of the system is configured to determine a degree of deviation from the calculated range limit of each of the one or more variables of the at least one unit to indicate severity for the at least one identified failure mode over the predefined finite period. The correlation determination module is configured to determine a degree of correlation of each of the one or more variables of the at least one unit to indicate detectability of the at least one identified failure mode over predefined finite period. The estimation module is configured to estimate a risk priority number of the at least one identified failure mode based on the identified occurrence, determined severity and detectability of the identified at least one failure mode.

In yet another embodiment, a non-transitory computer readable medium storing one or more instructions which when executed by a processor on a system to cause the processor to perform method. The method comprising receiving a plurality of operational data of one or more variables of at least one unit of a process plant and pre-processing the received plurality of operational data of the one or more variables to exclude one or more data points. Further, the method includes calculating a range limit of each of the one or more variables over a predefined finite period based on one or more operating loads of the at least one unit of the process plant, identifying at least one failure mode over a predefined finite period based on the calculated range limit of each of the one or more variables. Furthermore, the processor-implemented method includes determining a degree of deviation from the calculated range limit of variables of the at least one unit to indicate severity for the at least one identified failure mode over the predefined finite period, and a degree of correlation of variables to indicate detectability of the at least one identified failure mode over predefined finite period. At the final, the processor-implemented method includes estimating a risk priority number of the at least one identified failure mode based on the determined occurrence, severity and detectability of the identified at least one failure mode. It would be appreciated that the severity is linked to a predefined degree of deviation from the calculated range limit and the detectability is linked to a predefined degree of correlation among the one or more variables.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

The embodiments herein provide a system and method to estimate an operational risk associated with one or more failures in at least one unit of a process plant. It would be appreciated that there is a continuous stream of operational data of one or more variables such as temperature, pressure, etc. Herein, detections are defined in terms of acceptable/unacceptable ranges over predefined parameters. Often, these predefined parameters must be within a specified range based on operating condition of the process plant and when the measured parameters go beyond, a failure is detected. These limits are calculated from knowledge of the process or estimated from the measurements and performance data. The range limits for detection are adjusted dynamically based on the unit operating conditions. Hence, the operational risk associated with failure modes can be calculated and updated from time to time automatically from operational data of one or more variables of the at least one unit of the process plant.

Figure 1:
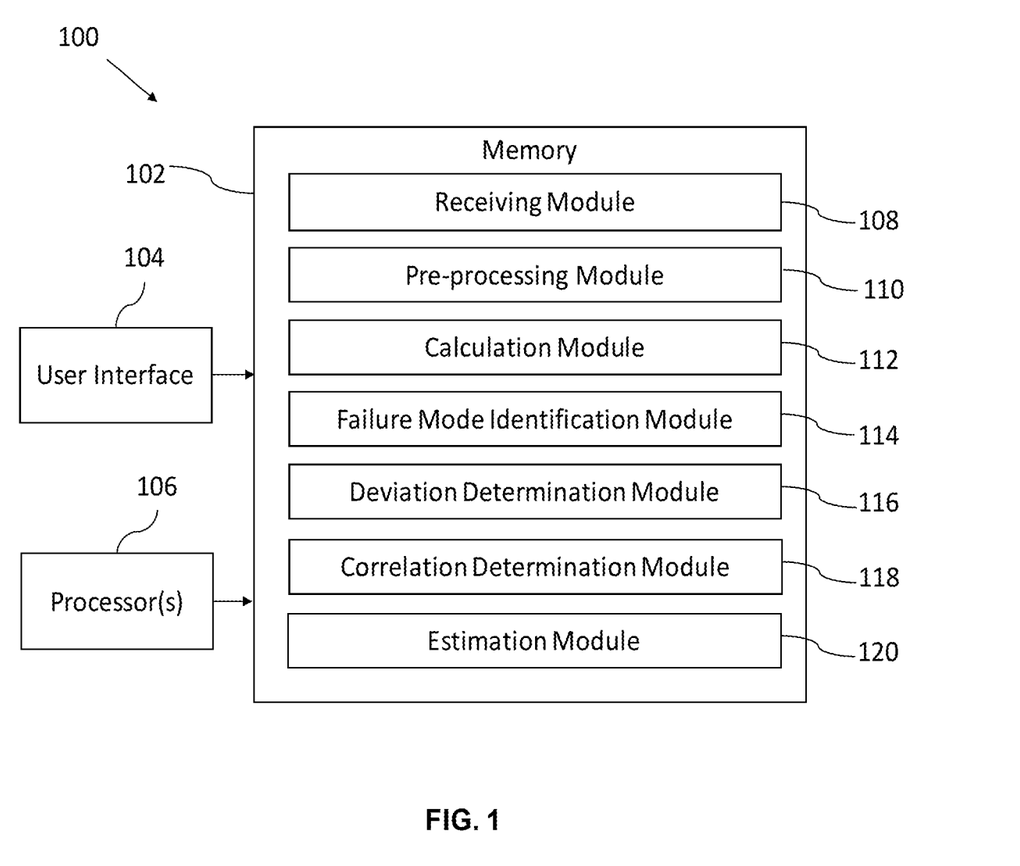
FIG. 1 illustrates an exemplary system to estimate an operational risk associated with one or more failures in at least one unit of a process plant according to some embodiments of the present disclosure.

Referring FIG. 1, illustrating a system (100) to estimate an operational risk associated with one or more failures in at least one unit of a process plant. In the preferred embodiment, the system (100) comprises at least one memory (102) with a plurality of instructions, at least one user interface (104) and one or more hardware processors (106) which are communicatively coupled with the at least one memory (102) to execute modules therein.

The one or more hardware processors (106) may be implemented as one or more microprocessors, microcomputers, microcontrollers, digital signal processors, central processing units, state machines, logic circuitries, and/or any devices that manipulate signals based on the operational instructions. Among other capabilities, the hardware processor (104) is configured to fetch and execute computer-readable instructions stored in the memory (102). Further, the system comprises a receiving module (108), a pre-processing module (110), a calculation module (112), a failure mode identification module (114), a deviation determination module (116), a correlation determination module (118), and an estimation module (120).

In the preferred embodiment of the disclosure, the receiving module (108) of the system (100) is configured to receive a plurality of operational data of one or more variables of at least one unit of a process plant. The one or more variables includes a temperature, a pressure, levels of vibration, and noise. A continuous stream of the plurality of operational data is received in terms of measured quantities like temperature and pressure, which are process variables. Further, the operational data includes other measurements like level of vibration, and noise, that indicate other aspects of the system.

In the preferred embodiment of the disclosure, pre-processing module (110) of the system (100) is configured to pre-process the received plurality of operational data of the one or more variables to exclude one or more data points. Wherein, the one or more data points are corresponding to an input to one or more sensors of the at least one unit, a shutdown and a restart of the at least one unit. State of shutdown and restart of at least one unit of process plant can be identified from operational data of one or more variables.

Figure 2:
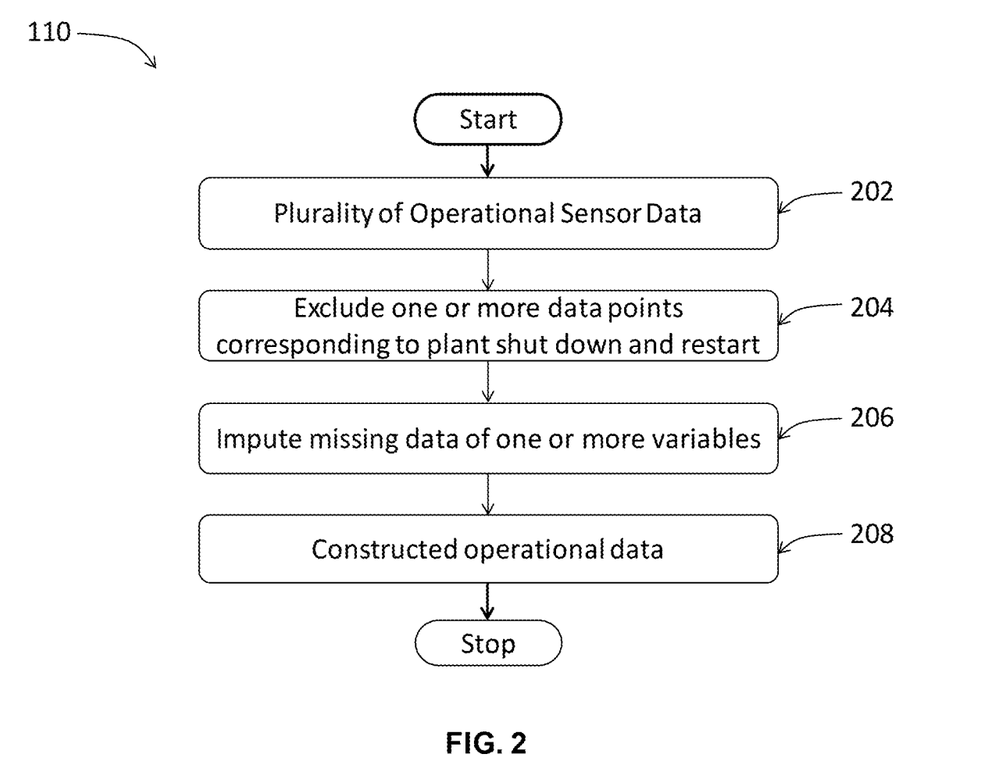
FIG. 2 illustrates a flow diagram to pre-process the operational data in accordance with some embodiments of the present disclosure.

Referring FIG. 2, wherein an operating load in the operational data goes to near zero during plant shutdown and restart state of the process plant. So operational data corresponding to operating load less than 100 Mega Watt (MW) are considered as event of process plant shutdown and restart. It is to be noted that wherein one or more data points of one or more variables are missing, an imputation is carried using a data analytics technique i.e. Kalman filter to impute missing values of time series data.

In the preferred embodiment of the disclosure, the calculation module (112) of the system (100) is configured to calculate a range limit of each of the one or more variables over a predefined finite period based on one or more operating loads of the at least one unit of the process plant. It would be appreciated that the range limit calculation is defined in terms of acceptable and unacceptable ranges over measured one or more variables. Often, the one or more variables are within a predefined range based on a defined operating load of the at least one unit. It would be appreciated that the range limit calculation is a dynamic process over a finite period in terms of values of one or more variables. Range limits of at least one unit of process plant at intermediate and full load are available from predicted performance data. This range limits at intermediate and full load of at least one unit of process plant are used to calculate range limits at current operating load.

Figure 3:
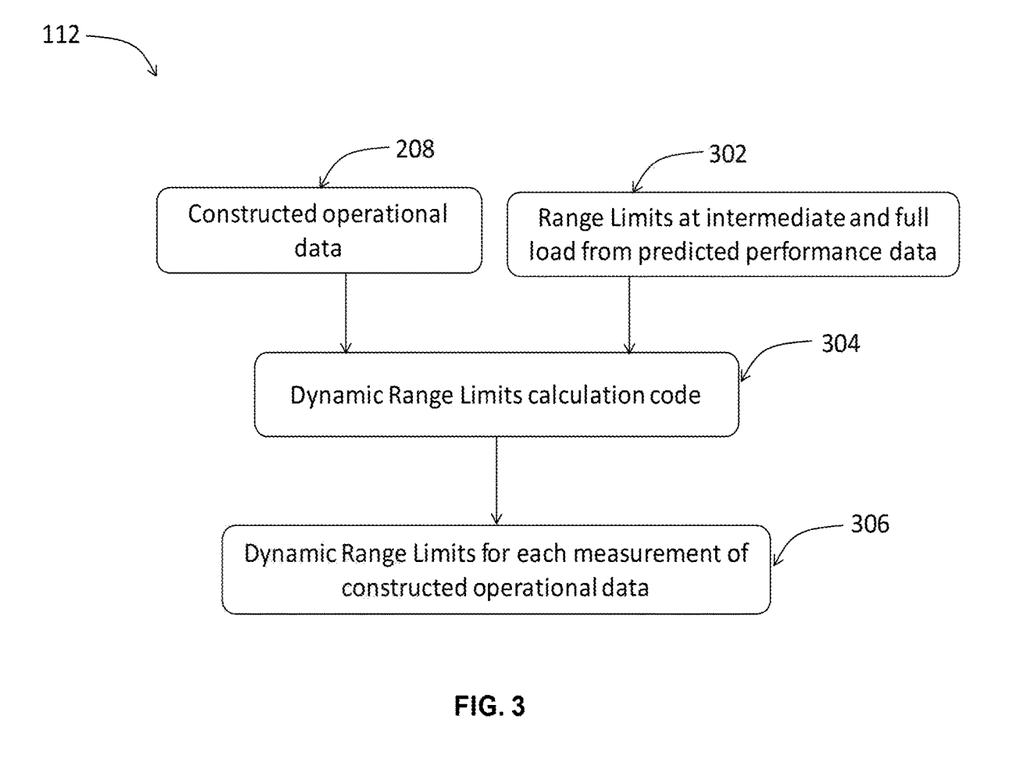
FIG. 3 illustrates a schematic diagram to determine dynamic limits from the pre-processed operational data in accordance with some embodiments of the present disclosure.

In another example, wherein range limits of a flue gas exit temperature of at least one unit of process plant operating at 315 MW are 119° C. and 127° C. Similarly, range limits of the flue gas exit temperature of at least one unit of process plant operating at 420 MW are 125° C. and 133° C. Range limits for current operating load of at least one unit of process plant ranging from 315 MW to 420 MW are calculated by linearly interpolating limits at above intermediate load. Calculated range limits of the flue gas exit temperature of at least one unit of process plant operating at 350 MW are 121° C. and 129° C. If value of flue gas exit in between 121° C. and 129° C. for current operating load of 350 MW is acceptable otherwise unacceptable as shown in FIG. 3.

In the preferred embodiment of the disclosure, the failure mode identification module (114) of the system (100) is configured to identify at least one failure mode over a predefined finite period based on the calculated range limit of each of the one or more variables. It is to be noted that the at least one failure mode occurs when the operational data of each of the one or more variables go beyond a predefined threshold range limits in the predefined finite time. Herein, occurrence of the at least one failure mode is considered a single event for the predefined finite period. The range limit may vary based on changes happen in the one or more variables. Similar exercise is carried out for all failure modes of interest and number of times detection of each failure mode is identified is the occurrence.

Figure 4:
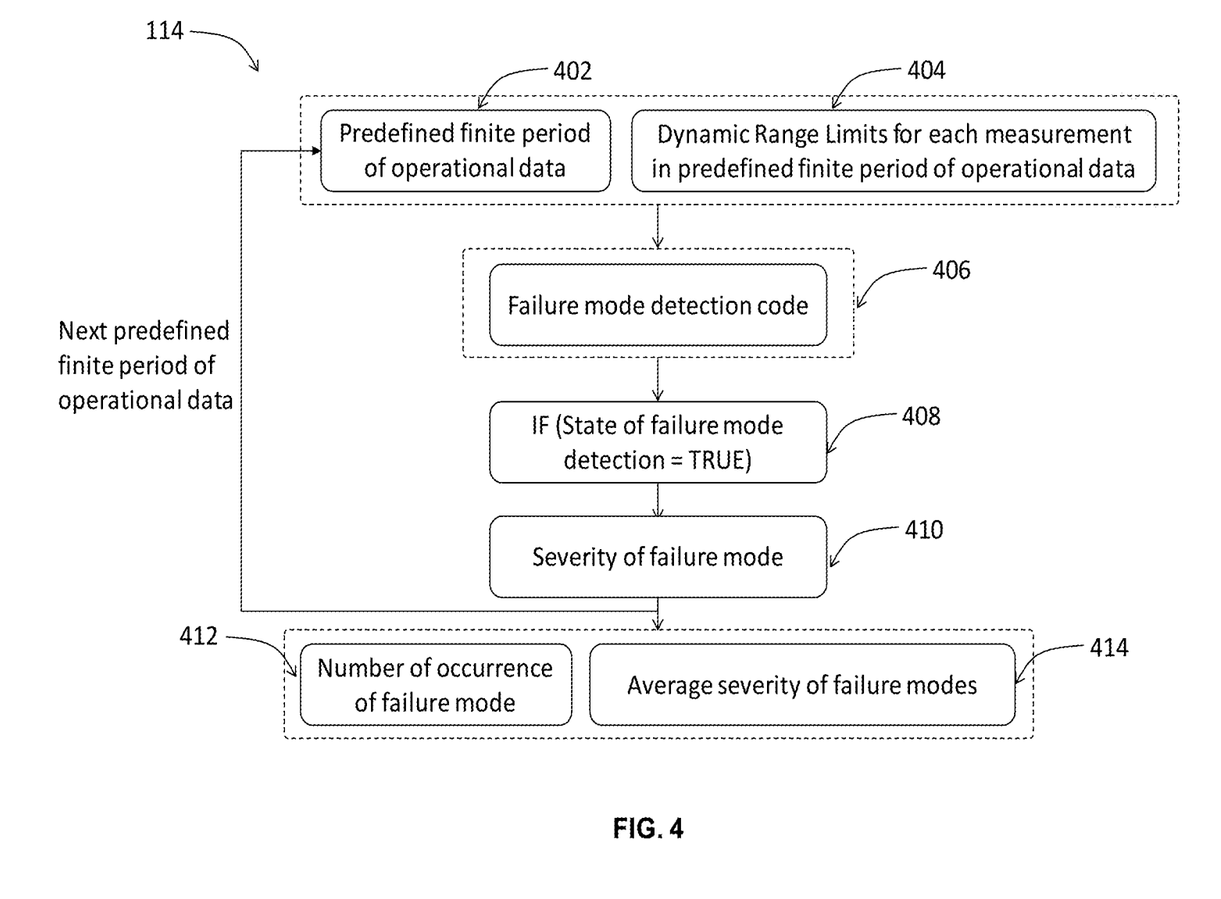
FIG. 4 illustrates a schematic diagram to determine failure modes in accordance with some embodiments of the present disclosure.

Referring FIG. 4, wherein operational data of last three months with one-minute frequency is considered for detection of failure mode in a process plant. Detection of high excess air failure mode in the process plant is detected through two variables of operational data i.e. a flue gas exit temperature and O2 at economizer outlet. Detection condition for the high excess failure mode is flue gas exit temperature and O2 at economizer outlet are more than upper bound of their respective range limits. Predefined finite period of operational data is constructed by slicing 30 minutes of window through operational data with sliding length of 1 minute. Predefined finite period of operational data is compared with calculated range limits of the two variables for detection of failure mode. If predefined finite period of operational data is outside the range limits for 90% of the time window is considers as detection of failure mode. E.g. the flue gas exit temperature and O2 at economizer outlet are 134° C. and 3.93 respectively for first time step in 30 minutes window and which are more than 129 C and 3.68 respectively. If above condition is satisfied for 90% of the time in window, then high excess air failure mode is detected otherwise same comparison is done by sliding the window until failure mode is detected.

In the preferred embodiment of the disclosure, the deviation determination module (116) of the system (100) is configured to determine a degree of deviation from the calculated range limit of each of the one or more variables of the at least one unit to indicate severity for the at least one identified failure mode over the predefined finite period.

Figure 5:
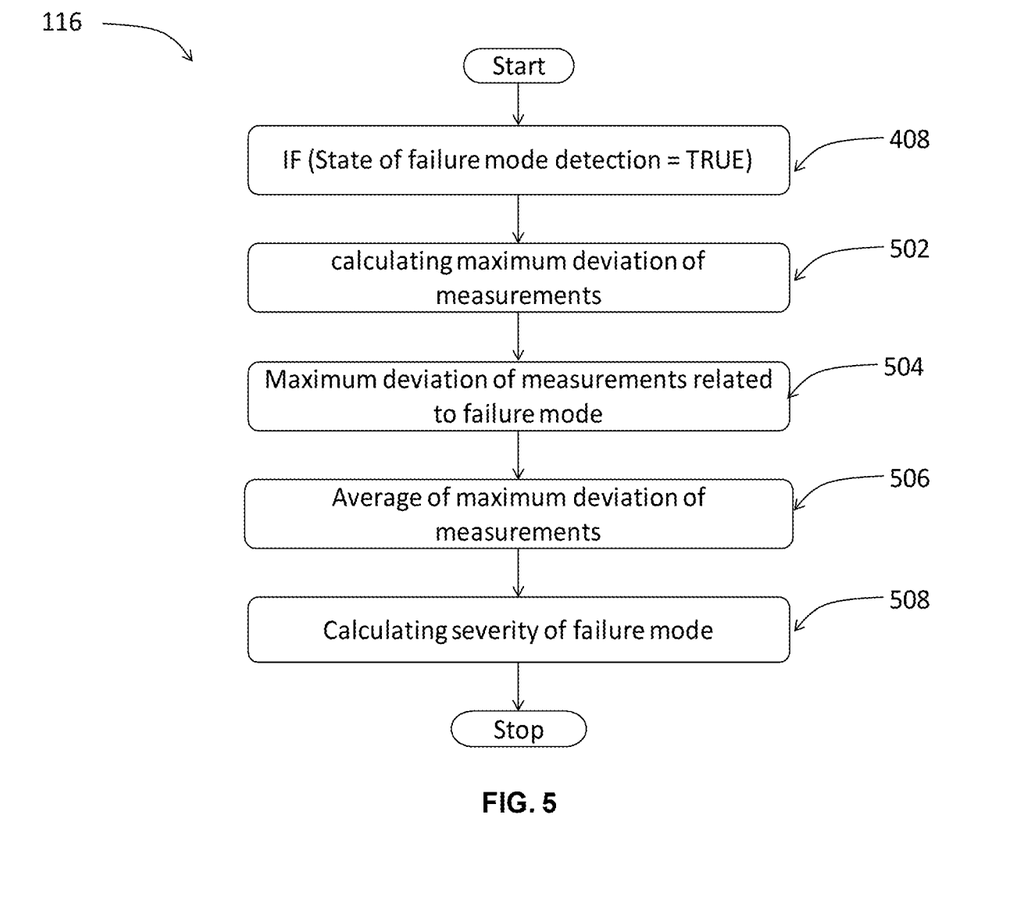
FIG. 5 illustrates a flow diagram to calculate severity of the failure modes in accordance with some embodiments of the present disclosure.

In one instance, wherein the failure mode is detected in operational data, the deviation determination module is triggered. In 30 minutes, window, maximum deviation of flue gas exit temperature and maximum deviation of O2 at economizer outlet from their respective range limits are calculated separately. Maximum deviation of flue gas exit temperature and maximum deviation of O2 at economizer outlet are 5° C. and 0.25 from upper bound of range limit. Maximum percentage deviation of flue gas exit temperature and maximum percentage deviation of O2 at economizer outlet with respect range limits are 3.87% and 6.79% respectively. Average of percentage degree of deviation occurred for high excess air failure mode is average of maximum percentage deviations of flue gas exit temperature and maximum percentage deviation O2 at economizer outlet which is severity of high excess air failure mode. The severity of high excess failure mode is 5.33%. The high excess air failure mode is detected 16 times in 3 months of operational data. Average severity is calculated by averaging above computed severity values of 16 occurrences of high excess air failure mode which is 8% for 3 months of operational data as shown in FIG. 5.

Furthermore, wherein occurrences of the failure mode are a number of times of failure mode is identified from the operational data. Occurrence rating is obtained by converting occurrences of failure modes on 1-10 scale. Severity rating of the failure modes is obtained by converting an average severity of failure mode on 1-10 scale. The high excess air failure mode is detected 16 times in 3 months operational data. Once the failure mode is detected in 30 minutes window, the next occurrence of detection of failure modes will not be counted until operational data of the variables comes within the acceptable range limits for at least 1 hour. Similarly, occurrences of detection of list failure modes are calculated in 3 months of operational data. E.g. Occurrences of high excess air, poor pick up in RH zone and lower air to fuel ratio failure modes are 16, 10 and 8 respectively. Occurrence ratings of failure modes are calculated by converting above calculated occurrences on 1-10 scale. Occurrence ratings of high excess air, poor pick up in RH zone and lower air to fuel ratio failure modes on 1-10 scale are 8, 5 and 4 respectively. Severity ratings of high excess air, poor pick up in RH zone and lower air to fuel ratio failure modes on 1-10 scale are 8, 5 and 4 respectively.

In the preferred embodiment of the disclosure, the correlation determination module (118) of the system (100) is configured to determine a degree of correlation of each of the one or more variables of the at least one unit to indicate detectability of the at least one identified failure mode over predefined finite period.

Figure 6:
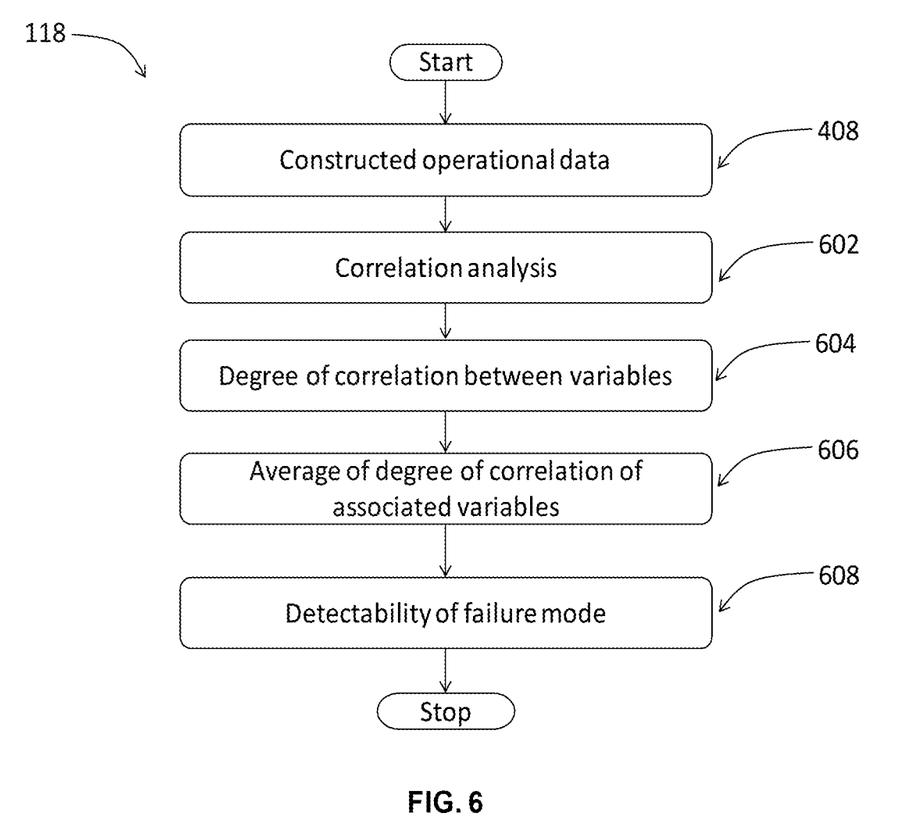
FIG. 6 illustrates a flow diagram to calculate detectability of the failure modes in accordance with some embodiments of the present disclosure.

It would be appreciated that the detectability rating of the failure mode is obtained by converting detectability of failure mode on 1-10 scale. In one example, wherein three months operational data of flue gas exit temperature, O2 at economizer outlet, etc. are considered for correlation analysis which computes degree of correlation between variables. E.g. degree of correlation between flue gas exit temperature and O2 at economizer outlet is 0.76. Detectability of failure mode is average of degree of correlation of associated variables, Detectability of high excess air, poor pick up in RH zone and lower air to fuel ratio failure modes are 0.76, 0.73 and 0.60. Detectability ratings of high excess air, poor pick up in RH zone and lower air to fuel ratio failure modes on 1-10 scale are 4, 4 and 6 respectively. High value of detectability means low detectability rating as shown in FIG. 6.

In the preferred embodiment of the disclosure, the estimation module (120) of the system (100) is configured to estimate a risk priority number of the at least one identified failure mode based on the identified occurrence, determined severity and detectability of the identified at least one failure mode. The risk priority number of failure mode is a multiplication of identified occurrence rating, determined severity rating and detectability.

Figure 7:
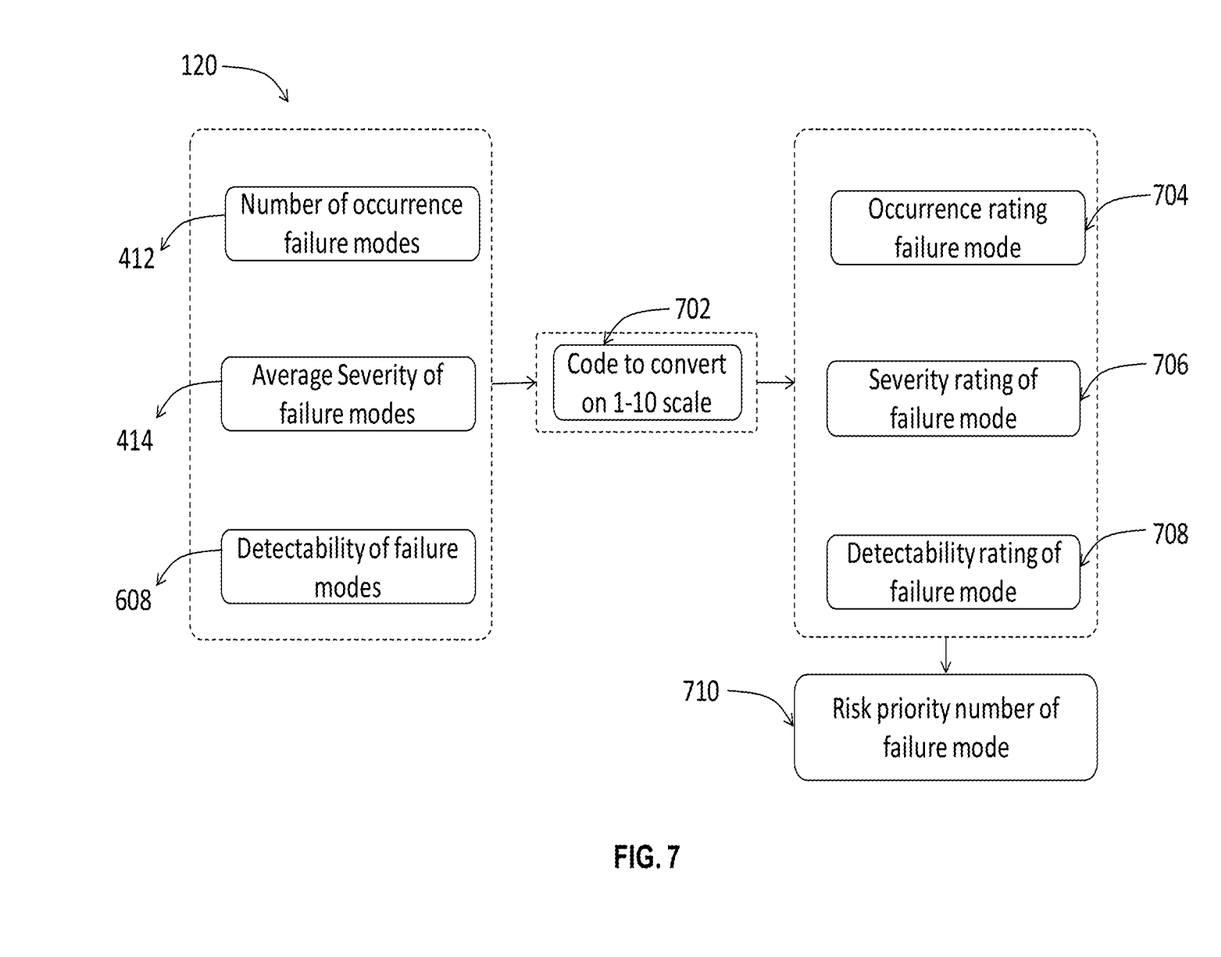
FIG. 7 illustrates a schematic diagram to get a risk priority number of failure modes in accordance with some embodiments of the present disclosure.

Referring FIG. 7, wherein the risk priority number of high excess air, poor pick up in RH zone and lower air to fuel ratio failure modes are 128, 100 and 96 respectively, thus, a corrective action is needed against high excess air failure mode.

Figure 8:
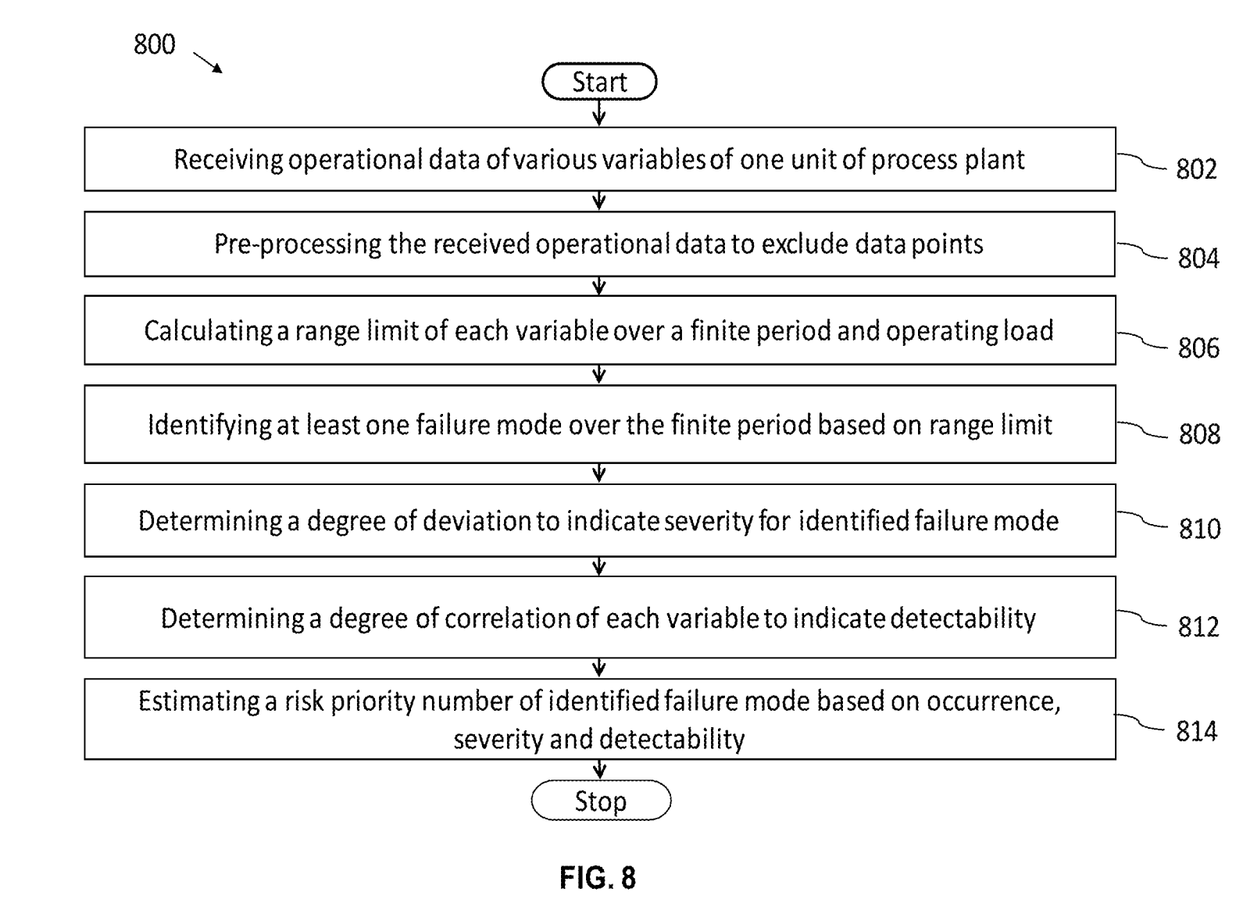
FIG. 8 is a flow diagram illustrating process to estimate an operational risk associated with one or more failures in at least one unit of a process plant in accordance with some embodiments of the present disclosure.

Referring FIG. 8, a flow chart to illustrate a processor-implemented method (800) to estimate an operational risk associated with one or more failures in at least one unit of a process plant. The method comprises one or more steps as follows.

Initially, at the step (802), receiving a plurality of operational data of one or more variables of at least one unit of a process plant. The one or more variables includes a temperature, a pressure, levels of vibration, and noise.

In the preferred embodiment of the disclosure, at the next step (804), pre-processing the received plurality of operational data of the one or more variables to exclude one or more data points. Wherein, the one or more data points are corresponding to an input to one or more sensors of the at least one unit, a shutdown and a restart of the at least one unit.

In the preferred embodiment of the disclosure, at the next step (806), calculating a range limit of each of the one or more variables over a predefined finite period based on one or more operating loads of the at least one unit of the process plant. Herein, the calculated range limit of each of the one or more variables includes an upper limit and a lower limit.

In the preferred embodiment of the disclosure, at the next step (808), identifying at least one failure mode over a predefined finite period based on the calculated range limit of each of the one or more variables. It would be appreciated that the at least one failure mode occurs when the operational data of each of the one or more variables go beyond a predefined threshold range limits in a predefined window of time.

In the preferred embodiment of the disclosure, at the next step (810), determining a degree of deviation from the calculated range limit of each of the one or more variables of the at least one unit to indicate severity for the at least one identified failure mode over the predefined finite period.

In the preferred embodiment of the disclosure, at the next step (812), determining a degree of correlation of each of the one or more variables of the at least one unit to indicate detectability of the at least one identified failure mode over predefined finite period.

In the preferred embodiment of the disclosure, at the last step (814), estimating a risk priority number of the at least one identified failure mode based on the identified occurrence, determined severity and detectability ratings of the identified at least one failure mode.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of risk priority number estimation whenever a failure occur in a unit of process plant. Existing methods require cross functional teams to sit together which take a lot of time to come up with ratings for failures and is based on subjective judgement of the team. In process FMEA, equipment or plant degrades with time changing the operational risk profile and hence it is difficult to estimate operational risk associated with failures from experience at more frequent intervals.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method (800) comprising:
    receiving (802), via one or more hardware processors, a plurality of operational data of a plurality of variables of at least one unit of a process plant, wherein the plurality of variables includes a temperature, a pressure, levels of vibration, and noise;
    pre-processing (804), via one or more hardware processors, the received plurality of operational data of the plurality of variables to exclude one or more data points, wherein exclusion of the one or more data points is corresponding to an input to one or more sensors of the at least one unit during a shutdown and a restart of the at least one unit of process plant is identified from operational data of one or more variables;
    dynamically calculating (806), via one or more hardware processors, a range limit of each of the plurality of variables over a predefined finite period based on the pre-processed plurality of operational data and one or more operating loads of the at least one unit of the process plant, wherein the calculated range limit is adjusted dynamically based on operating conditions of the at least one unit and wherein the range limits at a current operating load are dynamically calculated based on linear interpolation of range limits at intermediate and full operating loads of the at least one unit of process plant;
    identifying (808), via one or more hardware processors, at least one failure mode in an economizer of the at least one unit of process plant over a predefined finite period based on the dynamically adjusted range limit of each of the plurality of variables, wherein the at least one failure mode in the economizer comprises excess air failure mode, pick up in relative humidity (RH) zone, and air to fuel ratio failure mode, wherein the excess air failure mode in the economizer is detected through a flue gas exit temperature and O2 level at an economizer outlet, wherein occurrence of the at least one failure mode is identified when the operational data of each of the one or more variables exceed the dynamically adjusted range limits in the predefined finite period, wherein a historical operational data with one-minute frequency is considered for identifying the at least one failure mode, and wherein the range limit of each of the plurality of variables includes an upper limit and a lower limit;
    determining (810), via one or more hardware processors, a degree of deviation from the range limit of each of the plurality of variables of the at least one unit to indicate severity for the at least one identified failure mode over the predefined finite period;
    determining (812), via one or more hardware processors, a degree of correlation between the plurality of variables of the at least one unit to indicate detectability of the at least one identified failure mode over the predefined finite period, wherein the historical operational data is used for determining the degree of correlation;
    estimating (814), via one or more hardware processors, a risk priority number for assessing operational risk of the at least one identified failure mode based on the identified occurrence, determined severity and detectability of the identified at least one failure mode, wherein the operational risk associated with failure modes is calculated and updated from time to time automatically from the operational data of the plurality of variables of the at least one unit of the process plant; and
    taking a corrective action needed against the identified failure mode having a high value of the risk priority number, wherein the corrective action for the economizer is taken against the identified failure mode that have the high value of the risk priority number due to at least one of high excess air, poor pick up in the RH zone, and lower air to fuel ratio.

2. The method (800) claimed in claim 1, wherein the one or more operating loads of the at least one unit include an intermediate operating load or a full operating load.

3. The method (800) claimed in claim 1, wherein a number of occurrences are identified based on each failure when the operational data of each of the plurality of variables go beyond a predefined threshold range limit.

4. The system (100) comprising:
    at least one memory (102) storing a plurality of instructions;
    at least one user interface (104);
    one or more hardware processors (106) communicatively coupled with at least one memory (102), wherein one or more hardware processors (104) are configured to execute one or more modules;

a receiving module (108) configured to receive a plurality of operational data of a plurality of variables of at least one unit of a process plant, wherein the plurality of variables includes a temperature, a pressure, levels of vibration, and noise;

a pre-processing module (110) configured to pre-process the received plurality of operational data of the plurality of variables to exclude one or more data points, wherein the one or more data points are corresponding to an input to one or more sensors of the at least one unit during a shutdown and a restart of the at least one unit of process plant is identified from operational data of one or more variables;

a calculation module (112) configured to dynamically calculate a range limit of each of the plurality of variables over a predefined finite period based on one or more operating loads of the at least one unit of the process plant, wherein the calculated range limit of each of the plurality of variables includes an upper limit and a lower limit, and wherein the calculated range limit is adjusted dynamically based on operating conditions of the at least one unit and wherein the range limits at a current operating load are dynamically calculated based on linear interpolation of range limits at intermediate and full operating loads of the at least one unit of process plant;

a failure mode identification module (114) configured to identify at least one failure mode in an economizer of the at least one unit of process plant over a predefined finite period based on the dynamically adjusted range limit of each of the plurality of variables, wherein the at least one failure mode in the economizer comprises excess air failure mode, pick up in relative humidity (RH) zone, and air to fuel ratio failure mode, wherein the excess air failure mode in the economizer is detected through a flue gas exit temperature and O2 level at an economizer outlet, wherein occurrence of the at least one failure mode is identified when the operational data of each of the one or more variables exceed the dynamically adjusted range limits in the predefined finite period, wherein a historical operational data with one-minute frequency is considered for identifying the at least one failure mode, and wherein the at least one failure mode occurs when the operational data of each of the plurality of variables go beyond a predefined threshold range limits in a predefined window of time;

a deviation determination module (116) configured to determine a degree of deviation from the range limit of each of the plurality of variables of the at least one unit to indicate severity for the at least one identified failure mode over the predefined finite period;

a correlation determination module (118) configured to determine a degree of correlation between the plurality of variables of the at least one unit to indicate detectability of the at least one identified failure mode over the predefined finite period, wherein the historical operational data is used for determining the degree of correlation; and an estimation module (120) configured to
estimate a risk priority number for assessing operational risk of the at least one identified failure mode based on the identified occurrence, determined severity and detectability of the identified at least one failure mode, wherein the operational risk associated with failure modes is calculated and updated from time to time automatically from the operational data of the plurality of variables of the at least one unit of the process plant; and
take a corrective action needed against the identified failure mode having a high value of the risk priority number, wherein the corrective action for the economizer is taken against the identified failure mode that have the high value of the risk priority number due to at least one high excess air, poor pick up in the RH zone, and lower air to fuel ratio.

5. The system (100) claimed in claim 4, wherein the one or more operating loads of the at least one unit include an intermediate operating load or a full operating load.

6. The system (100) claimed in claim 4, wherein a number of occurrences are identified based on each failure when the operational data of each of the plurality of variables go beyond a predefined threshold range limit.

7. A non-transitory computer readable medium storing one or more instructions which when executed by a processor on a system, cause the processor to perform method comprising:

receiving (802), via one or more hardware processors, a plurality of operational data of a plurality of variables of at least one unit of a process plant, wherein the plurality of variables includes a temperature, a pressure, levels of vibration, and noise;

pre-processing (804), via one or more hardware processors, the received plurality of operational data of the plurality of variables to exclude one or more data points, wherein exclusion of the one or more data points is corresponding to an input to one or more sensors of the at least one unit during a shutdown and a restart of the at least one unit of process plant is identified from operational data of one or more variables;

dynamically calculating (806), via one or more hardware processors, a range limit of each of the plurality of variables over a predefined finite period based on the pre-processed plurality of operational data and one or more operating loads of the at least one unit of the process plant, wherein the calculated range limit is adjusted dynamically based on operating conditions of the at least one unit and wherein the range limits at a current operating load are dynamically calculated based on linear interpolation of range limits at intermediate and full operating loads of the at least one unit of process plant;

identifying (808), via one or more hardware processors, at least one failure mode in an economizer of the at least one unit of process plant over a predefined finite period based on the dynamically adjusted range limit of each of the plurality of variables, wherein the at least one failure mode in the economizer comprises excess air failure mode, pick up in relative humidity (RH) zone, and air to fuel ratio failure mode, wherein the excess air failure mode in the economizer is detected through a flue gas exit temperature and O2 level at an economizer outlet, wherein occurrence of the at least one failure mode is identified when the operational data of each of the one or more variables exceed the dynamically adjusted range limits in the predefined finite period, wherein a historical operational data with one-minute frequency is considered for identifying the at least one failure mode, and wherein the range limit of each of the plurality of variables includes an upper limit and a lower limit;

determining (810), via one or more hardware processors, a degree of deviation from the range limit of each of the plurality of variables of the at least one unit to indicate severity for the at least one identified failure mode over the predefined finite period;

determining (812), via one or more hardware processors, a degree of correlation between the plurality of variables of the at least one unit to indicate detectability of the at least one identified failure mode over the predefined finite period, wherein the historical operational data is used for determining the degree of correlation;

estimating (814), via one or more hardware processors, a risk priority number for assessing operational risk of the at least one identified failure mode based on the identified occurrence, determined severity and detectability of the identified at least one failure mode, wherein the operational risk associated with failure modes is calculated and updated from time to time automatically from the operational data of the plurality of variables of the at least one unit of the process plant; and taking a corrective action needed against the identified failure mode having a high value of the risk priority number, wherein the corrective action for the economizer is taken against the identified failure mode that have the high value of the risk priority number due to at least one of high excess air, poor pick up in the RH zone, and lower air to fuel ratio.

* * * * *